(12) United States Patent
Sakai et al.

(10) Patent No.: US 11,181,770 B2
(45) Date of Patent: Nov. 23, 2021

(54) LIQUID CRYSTAL DISPLAY PANEL AND METHOD FOR MANUFACTURING SAME

(71) Applicant: SHARP KABUSHIKI KAISHA, Sakai (JP)

(72) Inventors: Akira Sakai, Sakai (JP); Masahiro Hasegawa, Sakai (JP); Miho Yamada, Sakai (JP); Koji Murata, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/197,631

(22) Filed: Mar. 10, 2021

(65) Prior Publication Data

US 2021/0286213 A1 Sep. 16, 2021

(30) Foreign Application Priority Data

Mar. 11, 2020 (JP) .............................. JP2020-041951

(51) Int. Cl.
*G02F 1/1335* (2006.01)
*G02F 1/1343* (2006.01)
*G02F 1/1337* (2006.01)

(52) U.S. Cl.
CPC ...... *G02F 1/133528* (2013.01); *G02F 1/1337* (2013.01); *G02F 1/13439* (2013.01)

(58) Field of Classification Search
CPC ............. G02F 1/133528; G02F 1/1337; G02F 1/13439

USPC ........................................................... 349/56
See application file for complete search history.

(56) References Cited

U.S. PATENT DOCUMENTS

2020/0400871 A1* 12/2020 Asakawa ................. G02B 5/20

FOREIGN PATENT DOCUMENTS

| JP | 2003-057147 A | 2/2003 |
| JP | 2014-215421 A | 11/2014 |
| WO | 2008/053774 A1 | 5/2008 |

* cited by examiner

*Primary Examiner* — Nathanael R Briggs
*Assistant Examiner* — William D Peterson
(74) *Attorney, Agent, or Firm* — ScienBiziP, P.C.

(57) ABSTRACT

A liquid crystal display panel includes a first substrate, a second substrate, a liquid crystal layer, a first polarizing plate, and a second polarizing plate. The first substrate includes a first dielectric substrate, first and second electrodes, provided over the first dielectric substrate and configured to generate a transverse electric field in the liquid crystal layer, at least either of which has a plurality of slits, and a first alignment film placed in contact with the liquid crystal layer. The first substrate further includes an inorganic insulating layer provided between the second electrode and the first alignment film. The difference between the refractive index of the inorganic insulating layer and the refractive index of the second electrode is smaller than or equal to 0.20. The thickness of the inorganic insulating layer is greater than or equal to 50% of the thickness of the second electrode and greater than or equal to 40 nm.

11 Claims, 9 Drawing Sheets

EZContrast by ELDIM

EZContrast by ELDIM

LIQUID CRYSTAL DISPLAY PANEL AND METHOD FOR MANUFACTURING SAME

BACKGROUND

1. Field

The present disclosure relates to liquid crystal display panels and methods for manufacturing the same and, in particular, to a transverse electric field mode liquid crystal display panel and a method for manufacturing the same.

2. Description of the Related Art

A transverse electric field mode liquid crystal display panel is used in a wide range of uses in large-sized television receivers to uses in small-and-medium-sized mobiles.

A transverse electric field mode liquid crystal display panel having a pair of polarizing plates placed in a crossed Nicols arrangement is undesirably low (e.g. approximately 100) in contrast ratio at an oblique visual angle (polar angle) at an azimuth that is equally distant from the azimuths of polarizing axes of the pair of polarizing plates (namely an observer's side (front) polarizing plate and a backlight's side (back) polarizing plate) that are orthogonal to each other. Azimuth angles are defined here as follows. If a display surface of the liquid crystal display panel is compared to the dial of a clock, the 3 o'clock direction is referred to as an azimuth angle of 0°, the 12 o'clock direction as an azimuth angle of 90°, the 9 o'clock direction as an azimuth angle of 180°, and the 6 o'clock direction as an azimuth angle of 270° or −90°.

This problem becomes manifest, for example, as such a problem that when a backlight of a liquid crystal display panel whose front polarizing plate has its polarizing axis at an azimuth angle of 90° (−90°) is driven in a multifractioned manner, a halo is particularly conspicuous at an oblique visual angle (e.g. a polar angle of 60°) at azimuth angles of ±45° and ±135°. For the sake of ease, the following assumes that contrast ratios are low (or a halo is conspicuous) at "oblique azimuths and an oblique viewing angle".

According to a study by the inventors, the undesirably low contrast ratios at "oblique azimuths and an oblique visual angle" in a transverse electric field mode liquid crystal display panel are partly due to the structure of a comb electrode in an IPS mode liquid crystal display panel or a slit electrode (pixel electrode or common electrode) in an FFS mode liquid crystal display panel. The structure of an electrode like these, in which a plurality of slits and strip conductive parts divided by the slits are arrayed, causes diffraction to occur due to a refractive index difference between a strip conductive part (high refractive index) and a liquid crystal layer (low refractive index) in a slit interposed between strip conduction parts, thus causing a deterioration in contract ratio at "oblique azimuths and an oblique visual angle".

This problem has conventionally been addressed by attempting to uniform the optical structure of an electrode by filling a gap (i.e. a slit) between strip conductive parts with a high-refractive-index resin (including a particle-containing organic resin composition) having a refractive index which is close to that of the conductive parts (see, for example, International Publication No. 2008/053774). Furthermore, to address the undesirable incapability of planarizing the gap between the conductive parts without a sufficiently thick high-refractive-index resin layer, International Publication No. 2008/053774 also discloses that a translucent member having a refractive index which is close to that of the conductive parts is provided as a dummy layer in the gap between the conductive parts before a high-refractive-index resin layer is formed and then the high-refractive-index resin layer is formed so as to cover the conductive parts and the translucent member.

Forming a flat surface by filling a gap between strip conductive parts with a high-refractive-index resin as described in International Publication No. 2008/053774 is not easy and invites a rise in manufacturing cost.

It is desirable to provide a transverse electric field mode liquid crystal display panel that can be more inexpensively manufactured than the technology described in International Publication No. 2008/053774 with a reduction in deterioration of contrast ratios by diffraction of light due to an electrode structure and a method for manufacturing the same.

SUMMARY

According to an aspect of the disclosure, there is provided a liquid crystal display panel including: a first substrate; a second substrate that faces the first substrate; a liquid crystal layer provided between the first substrate and the second substrate; a first polarizing plate disposed at a side of the first substrate that faces away from the liquid crystal layer; and a second polarizing plate disposed at a side of the second substrate that faces away from the liquid crystal layer, wherein the first substrate includes a first dielectric substrate, first and second electrodes, provided over the first dielectric substrate and configured to generate a transverse electric field in the liquid crystal layer, at least either of which has a plurality of slits, and a first alignment film placed in contact with the liquid crystal layer, the second substrate includes a second dielectric substrate and a second alignment film provided over the second dielectric layer and placed in contact with the liquid crystal layer, the first substrate further includes an inorganic insulating layer provided between the second electrode and the first alignment film, a difference between a refractive index of the inorganic insulating layer and a refractive index of the second electrode is smaller than or equal to 0.20, and a thickness of the inorganic insulating layer is greater than or equal to 50% of a thickness of the second electrode and greater than or equal to 40 nm.

According to an aspect of the disclosure, there is provided a method for manufacturing the liquid crystal display panel according to Item 1, the method including forming the inorganic insulating layer by forming an inorganic insulating film on the second electrode by a thin-film deposition method.

DESCRIPTION OF THE EMBODIMENTS

A liquid crystal display panel according to an embodiment of the present disclosure and a method for manufacturing the same are described below with reference to the drawings. The present disclosure is not limited to the embodiment illustrated below.

Figure 1A:
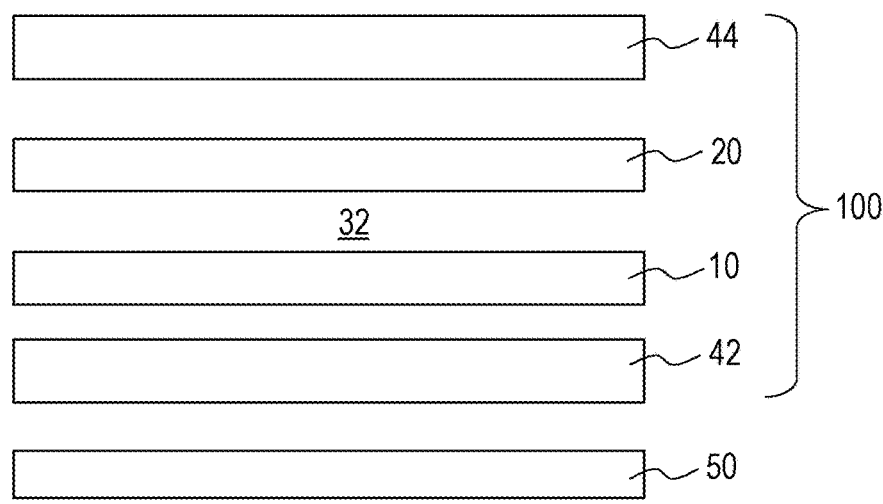
FIG. 1A is a schematic exploded cross-sectional view of a liquid crystal display panel according to an embodiment of the present disclosure, together with a backlight.
Figure 1B:
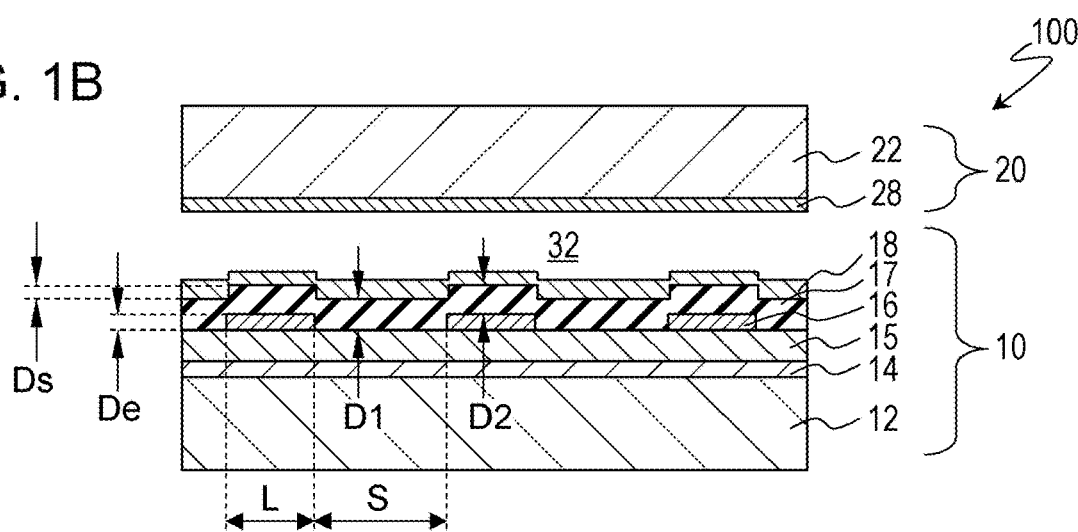
FIG. 1B is a schematic cross-section of a portion of the liquid crystal display panel that corresponds to one pixel.
Figure 1C:
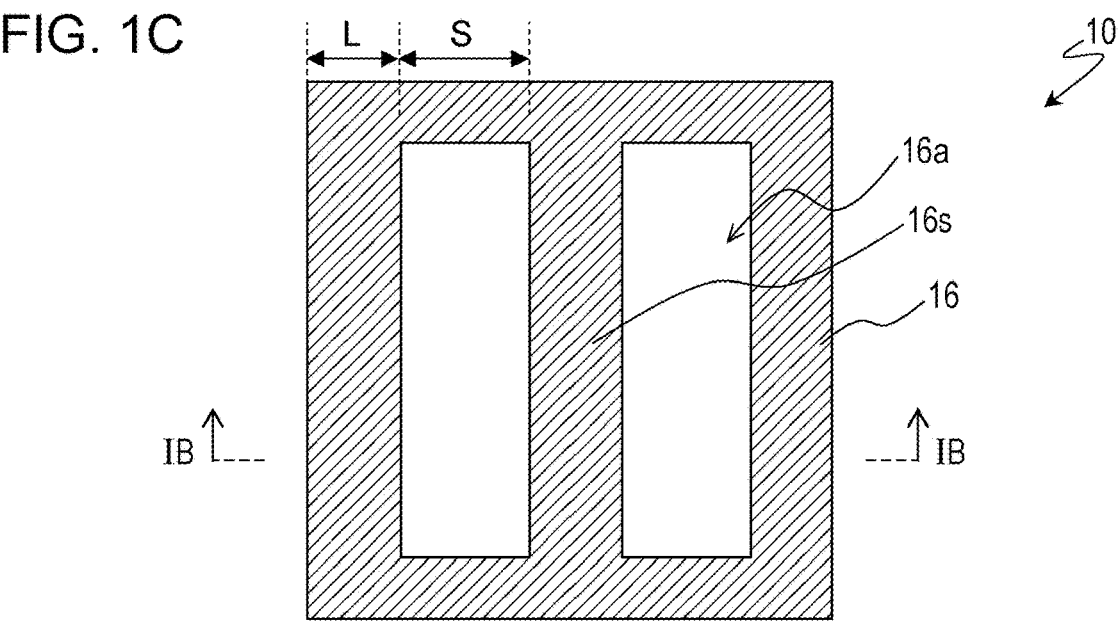
FIG. 1C is a schematic plan view of a portion of the liquid crystal display panel that corresponds to one pixel.

A structure of a liquid crystal display panel 100 according to the embodiment of the present disclosure is described with reference to FIGS. 1A, 1B, and 1C. FIG. 1A is a schematic exploded cross-sectional view of the liquid crystal display panel 100 according to the embodiment of the present disclosure, together with a backlight 50. A liquid crystal display device is constituted by the liquid crystal display panel 100, the backlight 50, a power supply device, or other components. The liquid crystal display panel 100 includes a plurality of pixels arranged in a matrix having rows and columns. FIG. 1B is a schematic cross-section of a portion of the liquid crystal display panel 100 that corresponds to one pixel, and is a cross-sectional view taken along line IB-IB in FIG. 1C. FIG. 1C is a schematic plan view of a portion of the liquid crystal display panel 100 that corresponds to one pixel.

The liquid crystal display panel 100 includes a TFT substrate (first substrate or back substrate) 10, a counter substrate (second substrate) 20 that faces the TFT substrate 10, a liquid crystal layer 32 provided between the TFT substrate 10 and the counter substrate 20, a first polarizing plate 42 disposed at the back (i.e. at a side of the TFT substrate 10 that faces away from the liquid crystal layer 32), and a second polarizing plate 44 disposed at an observer's side (i.e. at a side of the counter substrate 20 that faces away from the liquid crystal layer 32). One or more retardation films are provided as needed between the TFT substrate 10 and the first polarizing plate 42 and/or between the counter substrate 20 and the second polarizing plate 44.

The TFT substrate 10 includes a glass substrate (first dielectric substrate) 12, first and second electrodes 14 and 16, provided over the glass substrate 12 and configured to generate a transverse electric field in the liquid crystal layer 32, and a first alignment film 18 placed in contact with the liquid crystal layer 32. The second electrode 16 has a plurality of slits 16, and the second electrode 16 is disposed closer to the liquid crystal layer 32 than the first electrode 14 so as to face the first electrode 14 across a dielectric layer 15. The liquid crystal display panel 100 is an FFS mode liquid crystal display panel, and in this example, the first electrode 14 is a slitless solid electrode. For example, the first electrode 14 is a common electrode, and the second electrode 16 is a pixel electrode. Alternatively, the first electrode 14 may be a pixel electrode, and the second electrode 16 may be a common electrode. In this example, the second electrode 16 has a plurality of slits (plurality of rectangular openings extending parallel to each other) 16a and a plurality of linear portions 16s divided from each other by the plurality of slits 16a. The portions of the second electrode 16 other than the slits 16a are sometimes referred to as "conductive parts". A slit that the second electrode 16 has may be an opening or may be a notch. A width L of a linear portion 16s is for example greater than or equal to 1 μm and smaller than or equal to 8 μm, and a width S of a slit 16a is for example greater than or equal to 2 μm and smaller than or equal to 10 μm. It is preferable that a magnitude relationship between L and S be L≤S. The number of slits 16a is not limited to the example illustrated but needs only be at least 2. The number of slits 16a may be changed as appropriate, for example, according to the size of the pixel. A thickness De of the second electrode 16 is not limited to a particular thickness but is for example greater than or equal to 20 nm and smaller than or equal to 200 nm.

The refractive index of the second electrode 16 is for example higher than or equal to 1.70 and lower than or equal to 2.10. The second electrode 16 is formed by a transparent conductive layer having a refractive index of 1.8, such as an indium tin oxide (ITO) layer (refractive index: approximately 1.70 to 2.10), an indium zinc oxide (IZO (registered trademark)) layer (refractive index: approximately 1.70 to 2.10), or a layer of a mixture of these oxides.

The counter substrate 20 includes a glass substrate (second dielectric substrate) 22 and a second alignment film 28 provided over the glass substrate 22 and placed in contact with the liquid crystal layer 32.

The TFT substrate 10 further includes an inorganic insulating layer 17 provided between the second electrode 16 and the first alignment film 18. The difference between the refractive index of the inorganic insulating layer 17 and the refractive index of the second electrode 16 is smaller than or equal to 0.20, and the thickness of the inorganic insulating layer 17 is greater than or equal to 50% of the thickness of the second electrode 16 and greater than or equal to 40 nm.

It is more preferable that the difference between the refractive index of the inorganic insulating layer 17 and the refractive index of the second electrode 16 be smaller than or equal to 0.15. The refractive index of the inorganic insulating layer 17 may for example fall within a range of ±15% of the refractive index of the second electrode 16 (i.e. higher than or equal to 85% and lower than or equal to 115% of the refractive index of the second electrode 16). The thickness of the inorganic insulating layer 17 is not limited to a particular upper limit but is for example smaller than or equal to 300 nm.

The inorganic insulating layer 17 is formed so as to cover the conductive parts (linear portions 16s) and the slits 16a of the second electrode 16. As will be illustrated later, when the thickness of the second electrode 16 is greater than the thickness of the inorganic insulating layer 17, the inorganic insulating layer 17 may be divided into portions formed over the linear portions 16s of the second electrode 16 and portions formed in the slits 16a of the second electrode 16. Further, the thickness of the inorganic insulating layer 17 may vary between a thickness D1 of a portion of the inorganic insulating layer 17 formed in a slit 16a of the second electrode 16 and a thickness D2 of a portion of the inorganic insulating layer 17 formed over a linear portion 16s of the second electrode 16. The thickness of the inorganic insulating layer 17 refers to the thickness D1 of a portion of the inorganic insulating layer 17 in a slit 16a of the second electrode 16, unless otherwise noted. The inorganic insulating layer 17 is formed, for example, by a CVD method. The thickness of a film formed by a thin-film deposition method typified by the CVD method is hardly affected by a step of the ground on which the film is formed, and does not greatly vary with location. A surface step Ds of the inorganic insulating film 17 (i.e. a difference in height between a portion of the inorganic insulating layer 17 formed over a linear portion 16s of the second electrode 16 and a portion of the inorganic insulating layer 17 formed in a slit 16a of the second electrode 16) is greater than or equal to 90% of the thickness De of the second electrode 16.

The inorganic insulating layer 17 is for example a silicon nitride ($SiN_x$) layer or a silicon nitroxide ($SiN_xO_y$; x>y) layer. The refractive index of the inorganic insulating layer 17 is for example higher than or equal to 1.60 and lower than or equal to 2.00. The refractive index of silicon nitride ($SiN_x$) is approximately 1.60 to 2.20, and the refractive index of silicon nitroxide is approximately 1.60 to 1.90.

The provision of the inorganic insulating layer 17 over the second electrode 16 allows the liquid crystal display panel 100 to have improved contrast ratios at "oblique azimuths and an oblique visual angle". For example, it is preferable that the average of contrast ratios at (azimuth angle 45°, polar angle 60°), (azimuth angle −45°, polar angle 60°), (azimuth angle 135°, polar angle 60°), and (azimuth angle −135°, polar angle 60°) be greater than or equal to 200, more preferably greater than or equal to 300.

As will be described in examples later, the inventors found that improvement in contrast ratio of a transvers electric field mode liquid crystal display panel at "oblique azimuths and an oblique visual angle" can be brought about by forming a high-refractive index inorganic insulating layer so that the inorganic insulating layer covers a slit electrode. The improvement in contrast ratio at "oblique azimuths and an oblique visual angle" brought about by the inorganic insulating layer, which does not have a function of planarizing asperities on an electrode structure, was an unexpected result.

Although the mechanism by which improvement in contrast ratio at "oblique azimuths and an oblique visual angle" can be brought about by the inorganic insulating layer 17 is not completely clear, it is conceivable, at least, that the formation of the inorganic insulating layer 17 in the slits 16a of the second electrode 16 may contribute to reducing a difference in optical path length between light passing through the conductive parts of the second electrode 16 and light passing through the slits 16a of the second electrode 16. Further, it is also conceivable that the formation of the inorganic insulating layer 17 may contribute to causing both an interface between the conductive parts of the second electrode 16 and the liquid crystal layer 32 and an interface between the ground in the slits 16a and the liquid crystal layer 32 to be an interface between the inorganic insulating layer 17 and the liquid crystal layer 32. The alignment film formed over the second electrode 16 is considered to be minimally effective in bringing about improvement in contrast ratio at "oblique azimuths and an oblique visual angle", as the alignment film has a refractive index of approximately 1.55 to 1.75 and a thickness of roughly approximately 50 nm to 100 nm. In general, the refractive index of a liquid crystal material that constitutes the liquid crystal layer 32 is such that an ordinary ray refractive index no is equal to approximately 1.47 to 1.50 and an extraordinary ray refractive index ne is equal to approximately 1.55 to 1.61.

In the liquid crystal display panel 100, a weak anchoring alignment film (e.g. whose azimuth angle anchoring strength is higher than or equal to $1 \times 10^{-7}$ J/m² and lower than or equal to $1 \times 10^{-5}$ J/m²) may be used as the first alignment film 18. When the thickness of the inorganic insulating layer 17 is great, an effective voltage that is applied to the liquid crystal layer 32 drops, so that a voltage-transmittance curve may shift toward a high-voltage side. This shift can be suppressed by using a weak anchoring alignment film as the first alignment film 18.

The term "weak anchoring alignment film" refers to an alignment film, such as a polymer brush or PMMA, that has a weak or no alignment regulating force in a plane (horizontal plane) of the alignment film. A weak anchoring alignment film can be formed, for example, of a polymer brush described in Japanese Unexamined Patent Application Publication No. 2014-215421, the entire contents of which are hereby incorporated by reference. The term "anchoring strength" refers to the force with which an alignment film regulates the alignment direction of liquid crystal molecules (directors), and is handled with distinction between a polar angle anchoring strength that acts on the rotation of liquid crystal molecules in a substrate normal direction and an azimuth angle anchoring strength that acts on the rotation of liquid crystal molecules in a substrate in-plane direction. In the case of a transverse electric field mode liquid crystal display panel, only an azimuth angle strength needs to be taken into account. An azimuth angle anchoring strength can be measured, for example, by a method described in Japanese Unexamined Patent Application Publication No. 2003-57147.

The electrode structure of the liquid crystal display panel according to the embodiment of the present disclosure is not limited to the one illustrated, but an electrode structure of a publicly-known transverse electric field mode liquid crystal display panel can be widely applied. Typically, in a case where positive nematic liquid crystals whose dielectric anisotropy is positive are used, the absolute value of an angle formed by the direction in which the plurality of slits 16a of the second electrode 16 extend and the alignment azimuth of the first alignment film 18 is greater than or equal to 1° and smaller than or equal to 15° (preferably greater than or equal to 5° and smaller than or equal to 10°), and in a case where negative nematic liquid crystals whose dielectric anisotropy is negative are used, the absolute value of an angle formed by a direction perpendicular to the direction in which the plurality of slits 16a of the second electrode 16 extend and the alignment azimuth of the first alignment film 18 is greater than or equal to 1° and smaller than or equal to 15° (preferably greater than or equal to 5° and smaller than or equal to 10°). From the point of view of achieving high display mode efficiency (transmittance during white display) and, by extension, from the point of view of achieving a high contrast ratio in a normal direction and an oblique direction, it is preferable that the absorption axis of the second polarizing plate 44 and the alignment azimuth of the first alignment film 18 be parallel or orthogonal to each other.

The liquid crystal display panel 100 can be manufactured more inexpensively than the liquid crystal display panel described in International Publication No. 2008/053774. In the technology described in International Publication No. 2008/053774, a translucent member is formed in a gap between electrodes, and a high-refractive-index resin layer is formed so as to cover conductive parts of the electrode and the translucent member. The translucent member, which is provided for the purpose of planarizing the gap between the electrodes together with the high-refractive index resin, needs to be formed only in the gap between the electrodes. That is, the translucent member is formed by forming an inorganic insulating film over a slit electrode and then patterning the inorganic insulating film. On the other hand, the inorganic insulating layer 17 of the liquid crystal display panel 100 does not need to be patterned after having been formed over the second electrode 16.

Further, although a TFT substrate needs to be taken out from a vacuum chamber in order for a high-refractive-index resin layer to be formed, an inorganic insulating layer can be formed within the vacuum chamber immediately following a process of manufacturing the TFT substrate. Further, for example, a SiN layer is formed in a conventional process of manufacturing a TFT substrate, too, and there is no need to prepare a special material or apparatus.

The following shows examples and comparative examples. Sample panels that are simpler in structure than the liquid crystal display panel 100 were examined for contrast ratios at "oblique azimuths and an oblique visual angle".

Example 1

Figure 2A:
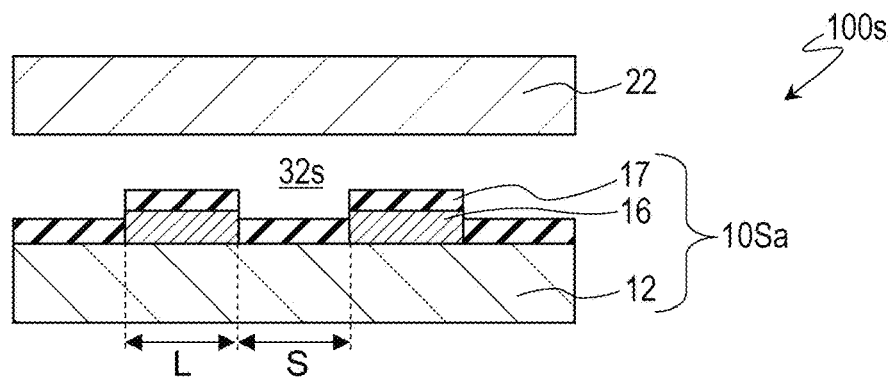
FIG. 2A is a schematic cross-sectional view of a sample panel of Example 1.

FIG. 2A is a schematic cross-sectional view of a sample panel 100s of Example 1. As shown in FIG. 2A, the sample panel of Example 1 is the sample panel 100s, prepared in the similitude of the liquid crystal display panel, which includes a sample substrate 10Sa prepared in the similitude of the TFT substrate, a glass substrate 22 prepared in the similitude of the counter substrate, a liquid layer 32s (prepared in the similitude of the liquid crystal layer) provided between the sample substrate 10Sa and the glass substrate 22, and polarizing plates (not illustrated) disposed on both sides. The sample substrate 10Sa includes a glass substrate 12, a second electrode 16 over the glass substrate 12, and an inorganic insulating layer (SiN layer) 17 over the second electrode 16. Further, a retardation film (not illustrated) was disposed between the sample substrate 10Sa and the lower polarizing plate to enlarge a visual angle.

The following describes each constituent element of the sample panel of Example 1 thus prepared:

Liquid Layer 32s: Glycerin, Refractive Index 1.47

Glass substrates 12 and 22: Thickness 0.5 mm, Refractive Index 1.526

Second Electrode 16: ITO Layer, Refractive Index 1.72, Thickness 65 nm

Inorganic Insulating Layer 17: SiN Layer, Refractive Index 1.85, Thickness D1=43 nm, D2=40 nm The second electrode 16 has an electrode structure shown in FIG. 1C. In the electrode structure, L=3 μm, and S=3 μm. The inorganic insulating layer 17 was formed by a CVD method.

Figure 2B:
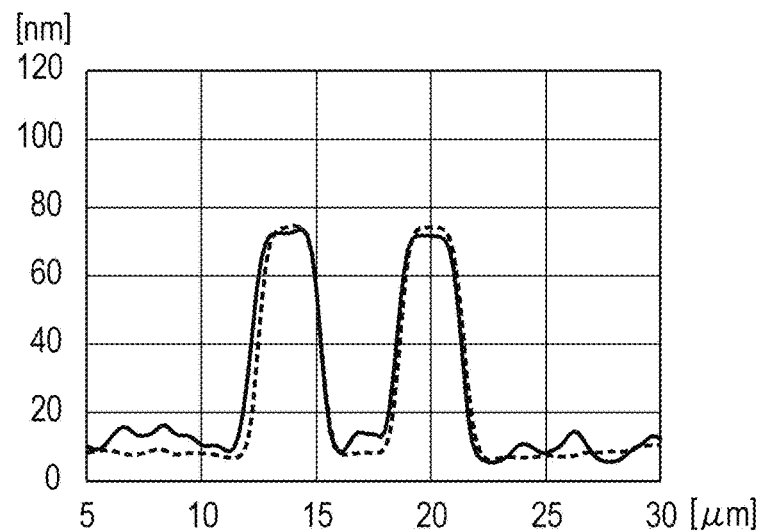
FIG. 2B is a diagram showing a result of a measurement of a surface profile of a sample substrate used in the sample panel of Example 1 (i.e. a surface profile of an inorganic insulating layer)

FIG. 2B is a diagram showing a result of a measurement of a surface profile of the sample substrate 10Sa used in the sample panel of Example 1 (i.e. a surface profile of the inorganic insulating layer 17). FIG. 2B uses a solid line to indicate the surface profile of the sample substrate 10Sa and uses a dashed line to also indicate a result of Comparative Example 1 (FIGS. 6A and 6B), which has no inorganic insulating layer 17. The peaks of the solid and dashed lines are kept aligned for the sake of illustration. The same applies to the subsequent drawings that show results of measurements of surface profiles. The surface profiles were measured by a contact type surface profiler (manufactured by KLA-Tencor Corporation, commercially available as P-16+).

Figure 2C:
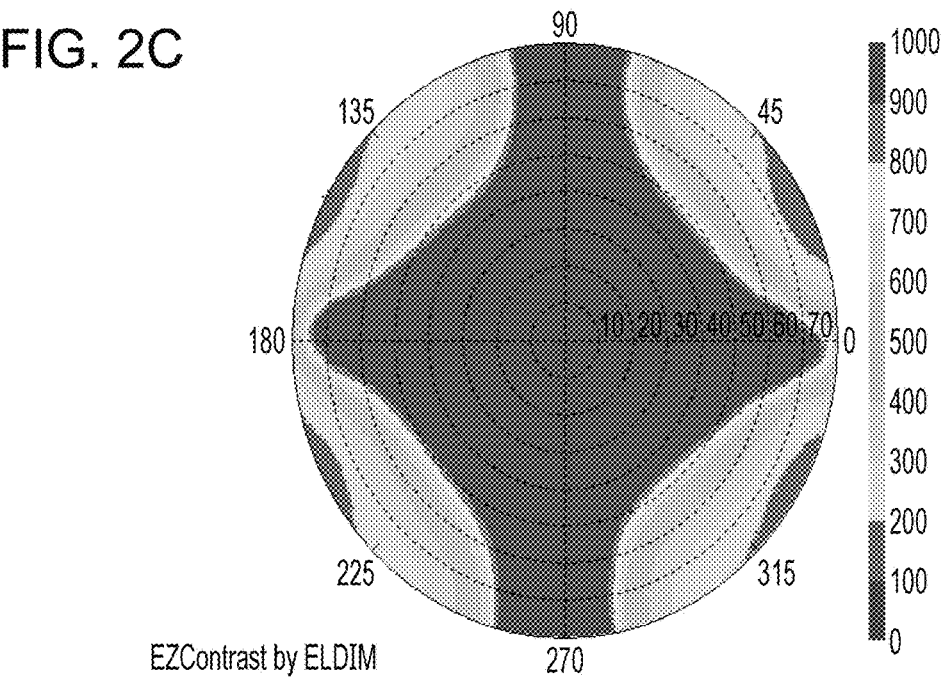
FIG. 2C is a diagram showing an iso-contrast curve of the sample panel of Example 1.

FIG. 2C is a diagram showing a calculated contrast ratio of the sample panel of Example 1 with respect to azimuth angles and polar angles (i.e. a diagram showing an iso-contrast curve). In FIG. 2C, the seven concentric circles represented by dashed lines indicate polar angles of 10°, 20°, 30°, 40°, 50°, 60°, and 70° in ascending order of radius, and the solid circle surrounding these concentric circles indicate a polar angle of 80°. On each of these circles, the 3 o'clock direction on the dial of a clock indicates an azimuth angle of 0°, the 12 o'clock direction an azimuth angle of 90°, the 9 o'clock direction an azimuth angle of 180°, and the 6 o'clock direction an azimuth angle of 270° or −90°. The same applies to the subsequent drawings that show iso-contrast curves.

In this example, the proportion of transmittance in a parallel Nicols arrangement of the first polarizing plate 42 and the second polarizing plate 44 to transmittance in a crossed Nicols arrangement of the first polarizing plate 42 and the second polarizing plate 44 was calculated as a contrast ratio. The second polarizing plate 44 and the second electrode 16 were arranged so that an angle formed by the absorption axis of the second polarizing plate 44 and the direction in which the slits 16a of the second electrode 16 extend was 7°. The contrast ratio was calculated by measuring the transmittance in the crossed Nicols arrangement and the transmittance in the parallel Nicols arrangement. The transmittances were each calculated by taking the average of transmittances at all wavelengths in a visible light range.

Example 2

Figure 3A:
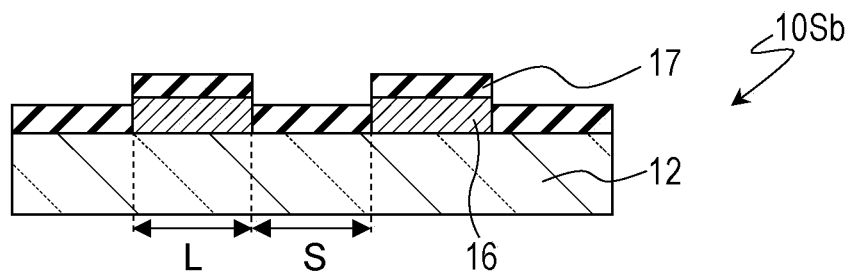
FIG. 3A is a schematic cross-sectional view of a sample substrate used in a sample panel of Example 2.

FIG. 3A is a schematic cross-sectional view of a sample substrate 10Sb used in a sample panel of Example 2. The sample panel of Example 2 differs from the sample panel of Example 1, which includes the sample substrate 10Sa, in that the sample panel of Example 2 includes the sample substrate 10Sb. The sample substrate 10Sb used in the sample panel of Example 2 differs from the sample substrate 10Sa in that the inorganic insulating layer 17 has a thickness D1 of 65 nm and a thickness D2 of 62 nm.

Figure 3B:
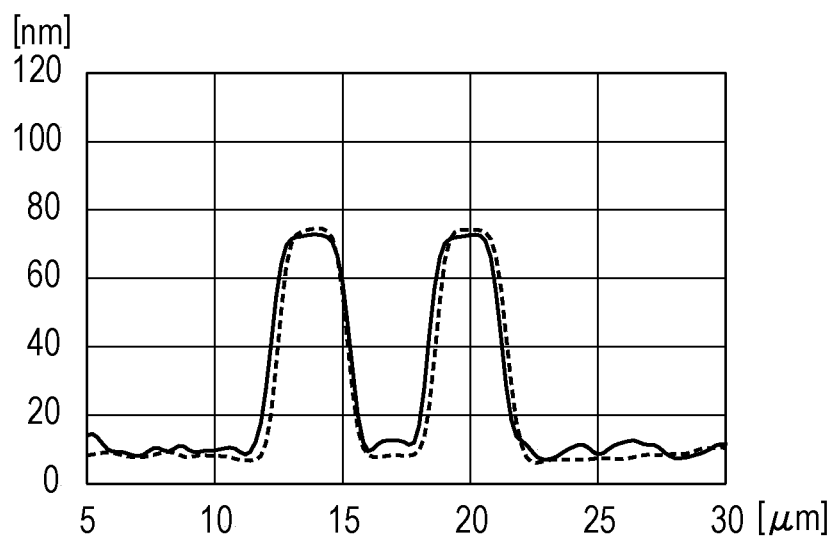
FIG. 3B is a diagram showing a result of a measurement of a surface profile of the sample substrate (i.e. a surface profile of an inorganic insulating layer)
Figure 3C:
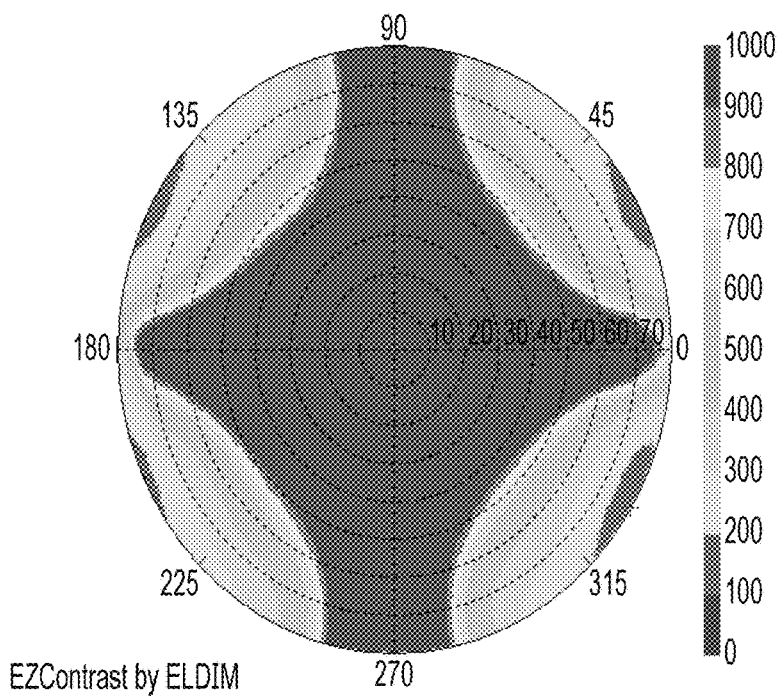
FIG. 3C is a diagram showing an iso-contrast curve of the sample panel of Example 2.
Figure 3D:
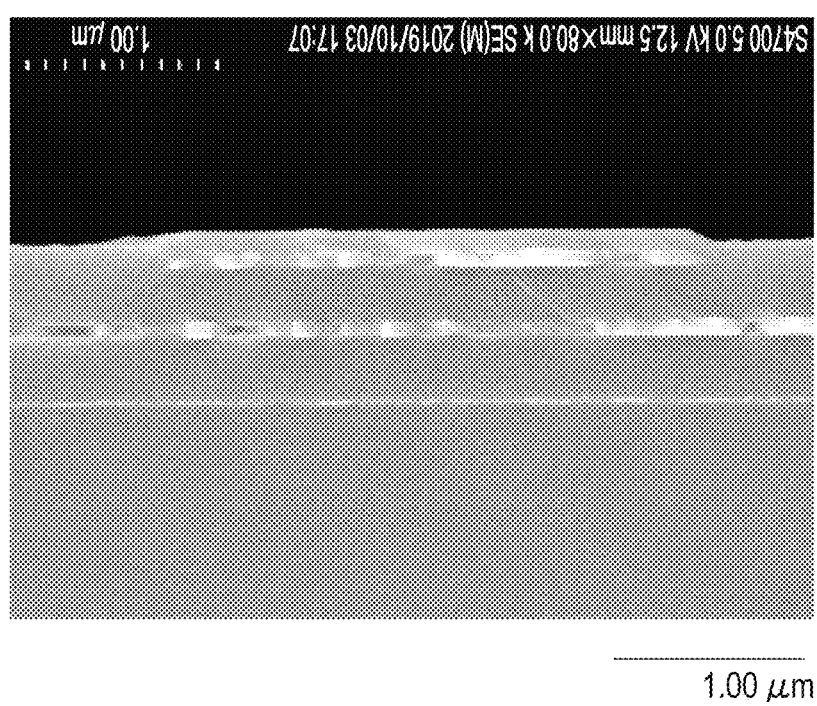
FIG. 3D shows a cross-sectional SEM image of the sample substrate.

FIG. 3B is a diagram showing a result of a measurement of a surface profile of the sample substrate 10Sb used in the sample panel of Example 2 (i.e. a surface profile of an inorganic insulating layer 17). FIG. 3C is a diagram showing an iso-contrast curve of the sample panel of Example 2. FIG. 3D is a SEM image of a cross-section of the sample substrate 10Sb used in the sample panel of Example 2.

Example 3

Figure 4A:
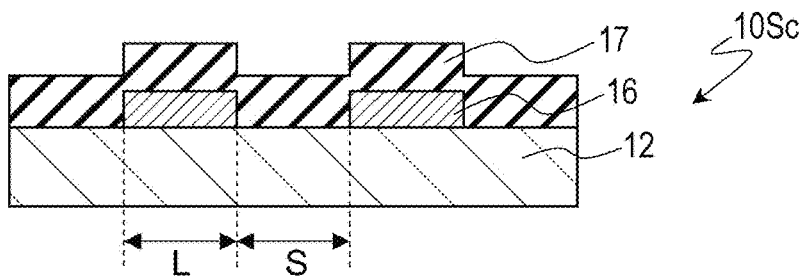
FIG. 4A is a schematic cross-sectional view of a sample substrate used in a sample panel of Example 3.

FIG. 4A is a schematic cross-sectional view of a sample substrate 10Sc used in a sample panel of Example 3. The sample panel of Example 3 differs from the sample panel of Example 1, which includes the sample substrate 10Sa, in that the sample panel of Example 3 includes the sample substrate 10Sc. The sample substrate 10Sc used in the sample panel of Example 3 differs from the sample substrate 10Sa in that the inorganic insulating layer 17 has a thickness D1 of 88 nm and a thickness D2 of 85 nm.

Figure 4B:
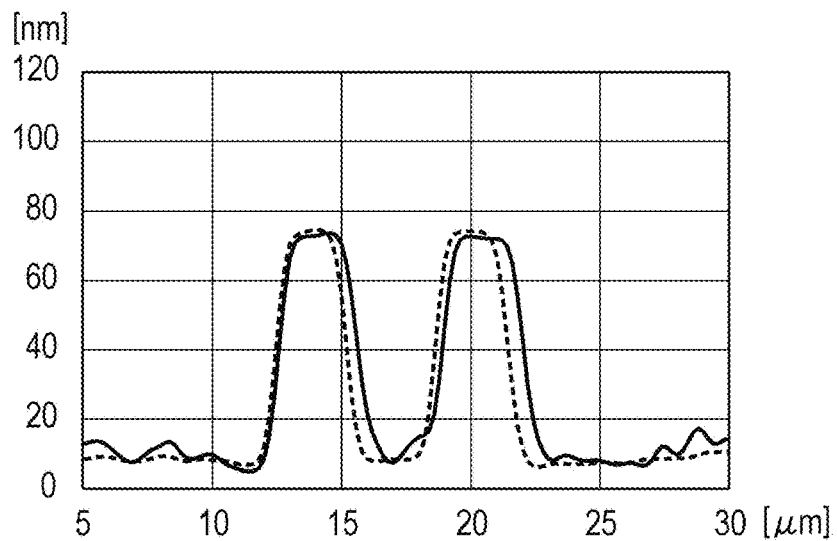
FIG. 4B is a diagram showing a result of a measurement of a surface profile of the sample substrate (i.e. a surface profile of an inorganic insulating layer)
Figure 4C:
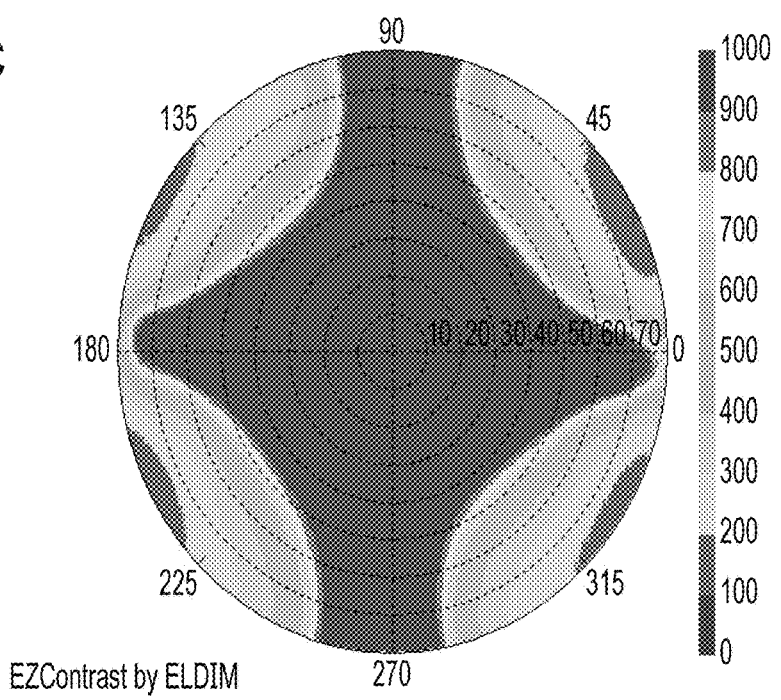
FIG. 4C is a diagram showing an iso-contrast curve of the sample panel of Example 3.

FIG. 4B is a diagram showing a result of a measurement of a surface profile of the sample substrate 10Sc used in the sample panel of Example 3 (i.e. a surface profile of an inorganic insulating layer 17). FIG. 4C is a diagram showing an iso-contrast curve of the sample panel of Example 3.

Example 4

Figure 5A:
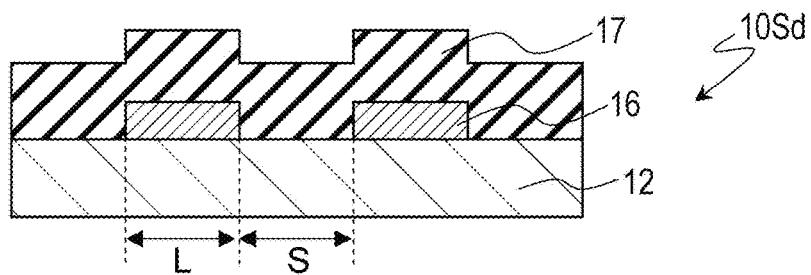
FIG. 5A is a schematic cross-sectional view of a sample substrate used in a sample panel of Example 4.

FIG. 5A is a schematic cross-sectional view of a sample substrate 10Sd used in a sample panel of Example 4. The sample panel of Example 4 differs from the sample panel of Example 1, which includes the sample substrate 10Sa, in that the sample panel of Example 4 includes the sample substrate 10Sd. The sample substrate 10Sd used in the sample panel of Example 4 differs from the sample substrate 10Sa in that the inorganic insulating layer 17 has a thickness D1 of 128 nm and a thickness D2 of 125 nm.

Figure 5B:
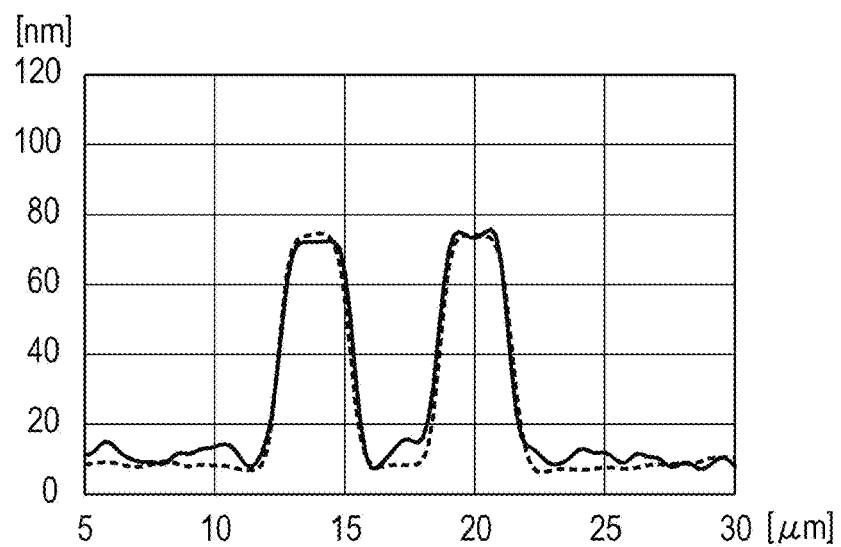
FIG. 5B is a diagram showing a result of a measurement of a surface profile of the sample substrate (i.e. a surface profile of an inorganic insulating layer)
Figure 5C:
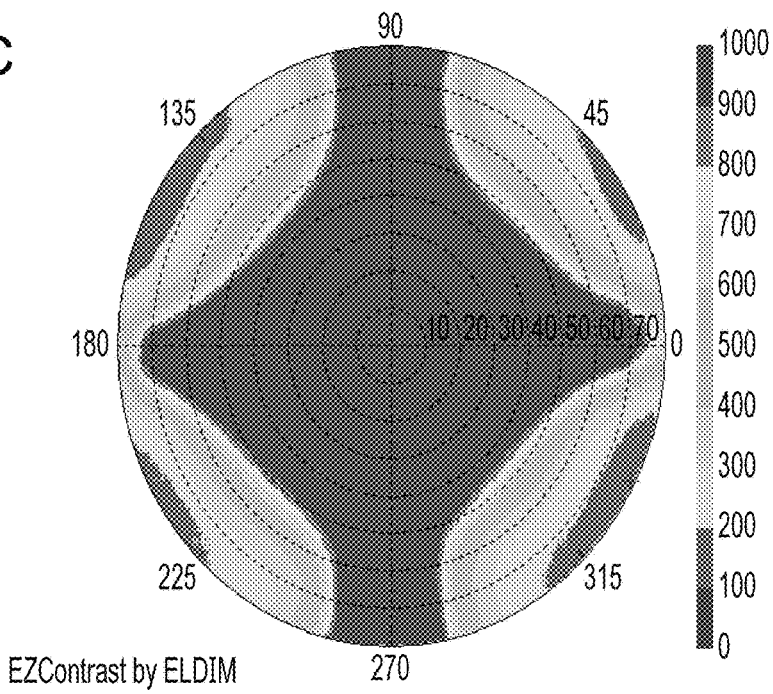
FIG. 5C is a diagram showing an iso-contrast curve of the sample panel of Example 4.

FIG. 5B is a diagram showing a result of a measurement of a surface profile of the sample substrate 10Sd used in the sample panel of Example 4 (i.e. a surface profile of an inorganic insulating layer 17). FIG. 5C is a diagram showing an iso-contrast curve of the sample panel of Example 4.

Comparative Example 1

Figure 6A:
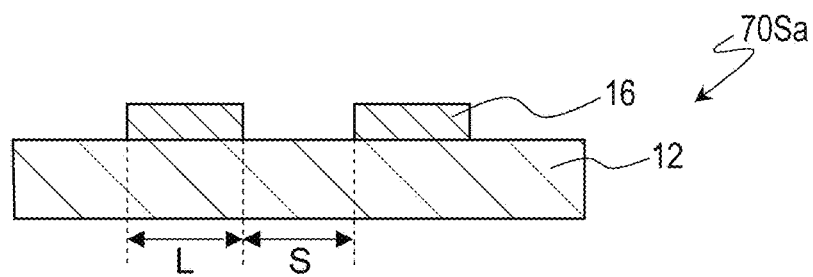
FIG. 6A is a schematic cross-sectional view of a sample substrate used in a sample panel of Comparative Example 1.

FIG. 6A is a schematic cross-sectional view of a sample substrate 70Sa used in a sample panel of Comparative Example 1. The sample panel of Comparative Example 1 differs from the sample panel of Example 1, which includes the sample substrate 10Sa, in that the sample panel of Comparative Example 1 includes the sample substrate 70Sa. The sample substrate 70Sa used in the sample panel of Comparative Example 1 differs from the sample substrate 10Sa in that the sample substrate 70Sa has no inorganic insulating layer 17.

Figure 6B:
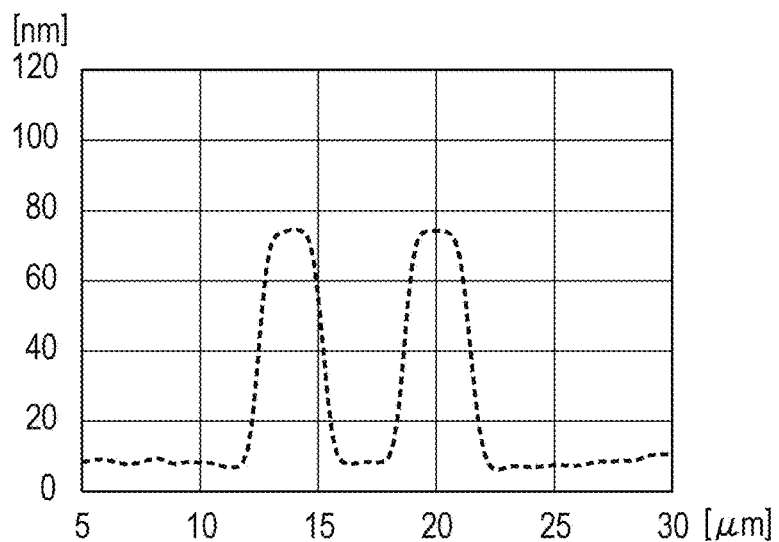
FIG. 6B is a diagram showing a result of a measurement of a surface profile of the sample substrate.
Figure 6C:
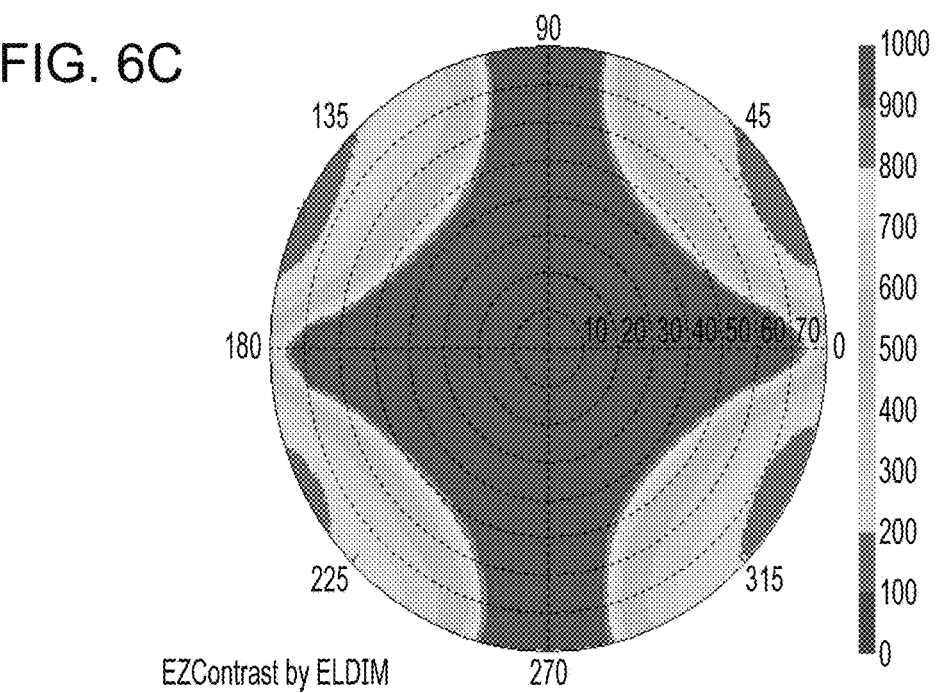
FIG. 6C is a diagram showing an iso-contrast curve of the sample panel of Comparative Example 1.

FIG. 6B is a diagram showing a result of a measurement of a surface profile of the sample substrate 70Sa used in the sample panel of Comparative Example 1. FIG. 6C is a diagram showing an iso-contrast curve of the sample panel of Comparative Example 1.

Comparative Example 2

Figure 7A:
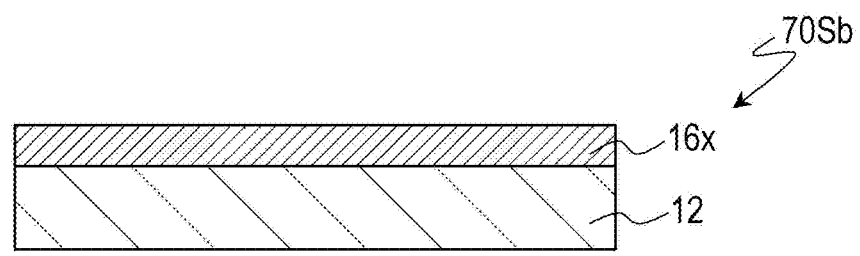
FIG. 7A is a schematic cross-sectional view of a sample substrate used in a sample panel of Comparative Example 2.

FIG. 7A is a schematic cross-sectional view of a sample substrate 70Sb used in a sample panel of Comparative Example 2. The sample panel of Comparative Example 2 differs from the sample panel of Comparative Example 1, which includes the sample substrate 70Sa, in that the sample panel of Comparative Example 2 includes the sample substrate 70Sb. The sample substrate 70Sb used in the sample panel of Comparative Example 2 differs from the sample substrate 70Sa in that a second electrode 16x is a slitless solid electrode.

Figure 7B:
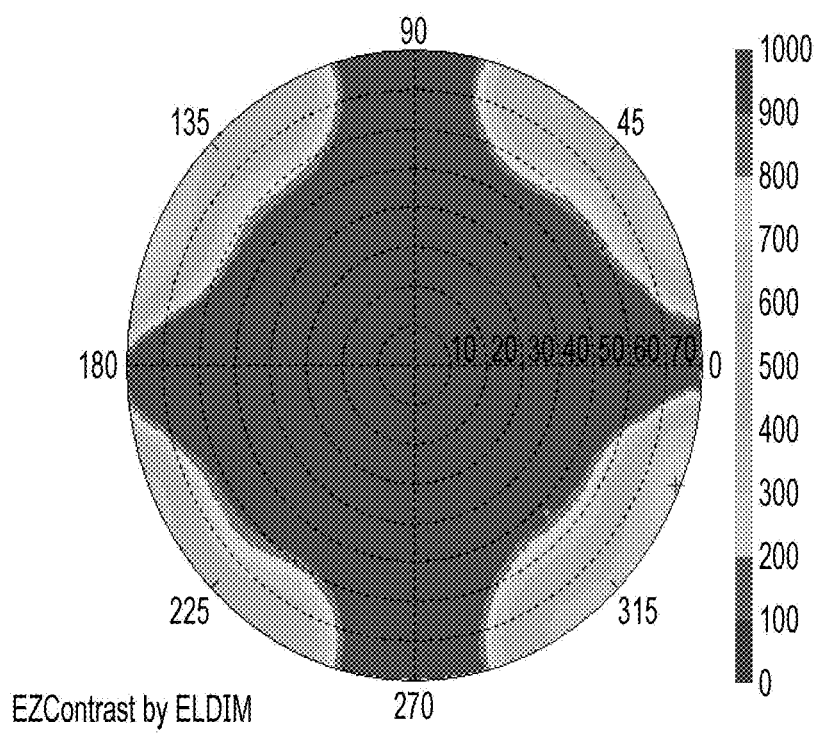
FIG. 7B is a diagram showing an iso-contrast curve of the sample panel of Comparative Example 2.

FIG. 7B is a diagram showing an iso-contrast curve of the sample panel of Comparative Example 2.

Reference Example

Figure 8:
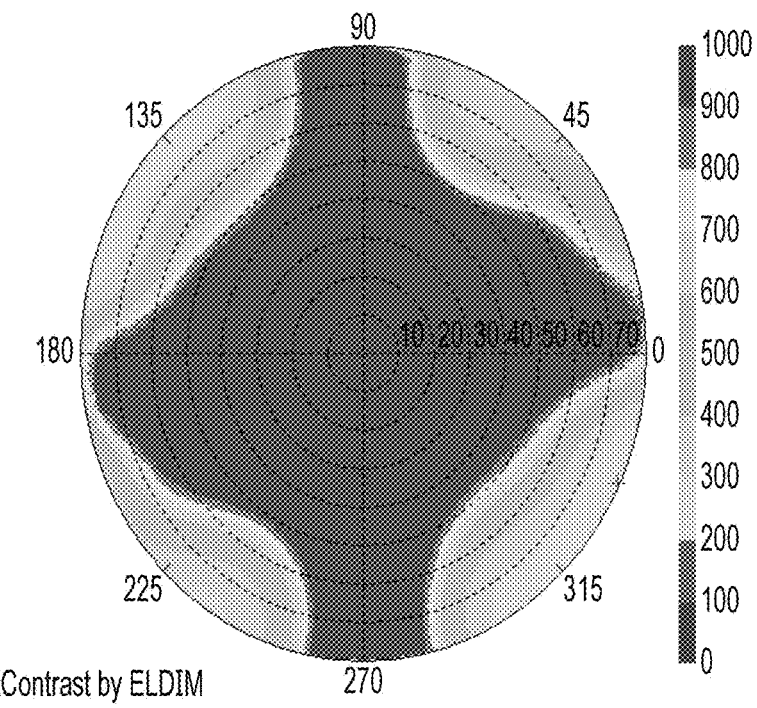
FIG. 8 is a diagram showing an iso-contrast curve of a sample panel of Reference Example.

FIG. 8 is a diagram showing an iso-contrast curve of a sample panel of Reference Example. The sample panel of Reference Example differs from the sample panel of Example 1 in that a glass substrate is used instead of the sample panel 100s. The glass substrate used in the sample panel of Reference Example is identical to the glass substrate 12 used in the sample panel of Example 1.

Table 1 shows the averages of contrast ratios at (azimuth angle 45°, polar angle 60°), (azimuth angle −45°, polar angle 60°), (azimuth angle 135°, polar angle 60°), and (azimuth angle −135°, polar angle 60°) for Examples 1 to 4, Comparative Examples 1 and 2, and Reference Example.

TABLE 1

|  | Ex. 1 | Ex. 2 | Ex. 3 | Ex. 4 | Comp. Ex. 1 | Comp. Ex. 2 | Ref. Ex. |
|---|---|---|---|---|---|---|---|
| Thickness D1 of SiN layer 17 [nm] (Portion of second electrode 16 in slit 16a) | 43 | 65 | 88 | 128 | NA | NA | NA |
| Thickness D2 of SiN layer 17 [nm] (Portion of second electrode 16 over linear portion 16s) | 40 | 62 | 85 | 125 | NA | NA | NA |
| Surface step Ds of SiN layer 17 [nm] | 62 | 62 | 62 | 62 | NA | NA | NA |
| Contrast ratio | 417 | 433 | 376 | 389 | 381 | 796 | 559 |

It was confirmed through a comparison between results of Reference Example and Comparative Example 1 that the sample panel of Comparative Example 1, which includes a second electrode 16, is lower in contrast ratio at "oblique azimuths and an oblique visual angle" than the sample panel of Reference Example, which includes no second electrode 16. Further, it was confirmed through a comparison between results of Comparative Examples 1 and 2 that the sample panel of Comparative Example 1, which includes a second electrode 16 having a plurality of slits, is lower in contrast ratio at "oblique azimuths and an oblique visual angle" than the sample panel of Comparative Example 2, which includes a second electrode 16x that is a slitless solid electrode. This shows that a deterioration in contrast ratio at "oblique azimuths and an oblique visual angle" occurs due to the generation of diffracted light by an electrode structure having slits and conductive parts.

Examples 1 to 4, each of which has an inorganic insulating layer 17 formed therein, were about equal or higher in contrast ratio at "oblique azimuths and an oblique visual angle" to or than Comparative Example 1. In particular, Examples 1 and 2 are higher in contrast ratio at "oblique azimuths and an oblique visual angle" than Comparative Example 1.

The sample panels of Examples 1 to 4 were structured not to include alignment films. On the other hand, as shown in FIG. 1A, the liquid crystal display panel 100 has the first orientation film 18 between the inorganic insulating layer 17 and the liquid crystal layer 32. The first alignment film 18 is considered to be minimally effective in bringing about improvement in contrast ratio at "oblique azimuths and an oblique visual angle", as the first alignment film 18 has a refractive index of approximately 1.55 to 1.75 and a thickness of roughly approximately 50 nm to 100 nm.

Figure 9:
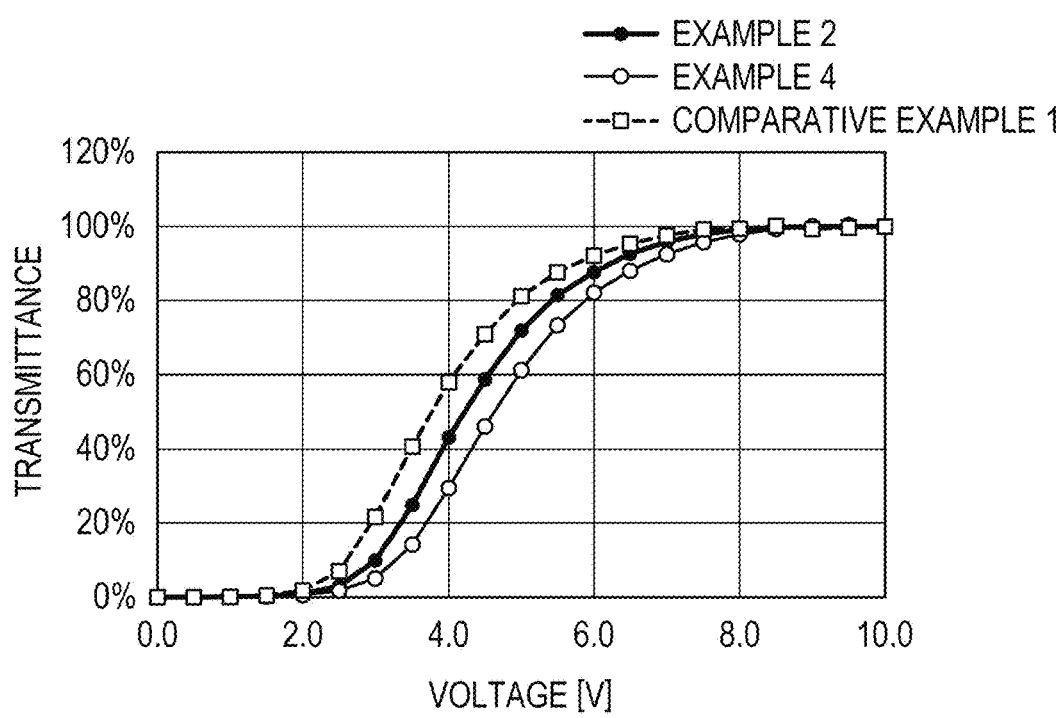
FIG. 9 is a diagram showing results of measurements of transmittance with respect to applied voltage in liquid crystal cells fabricated using the sample substrates used in the sample panels of Examples 2 and 4 and Comparative Example 1.

Measurements of transmittance with respect to applied voltage in liquid crystal cells fabricated using the sample substrates used in the sample panels of Examples 2 and 4 and Comparative Example 1 were carried out. FIG. 9 shows results of the measurements. The liquid crystal cell of Example 2 includes a substrate obtained by subjecting the inorganic insulating layer 17 of the sample substrate 10Sb used in the sample panel of Example 2 to a photo-alignment process after having applied a photo-alignment film onto the inorganic insulating layer 17, a substrate obtained by subjecting the glass substrate 22 to a photo-alignment process after having applied a photo-alignment film to the glass substrate 22, and a liquid crystal material of no=1.51 and ne=1.61 sealed in between the substrates with the substrates bonded together via a spacer with a gap of 3 μm. The liquid crystal cells of Example 4 and Comparative Example 1 were prepared in the same manner as the liquid crystal cell of Example 2, except that the sample substrate 10Sd used in Example 4 and the sample substrate 70Sa used in the sample panel of Comparative Example 1 were used instead of the sample substrate 10Sb, respectively. In FIG. 9, the transmittance of each example is normalized for the sake of illustration with the maximum value being 1. FIG. 9 shows that an increase in thickness of the inorganic insulating layer 17 leads to a reduction in transmittance with respect to the applied voltage, i.e. a shift in the voltage-transmittance curve toward a high-voltage side. As mentioned above, this shift can be suppressed by using a weak anchoring alignment film as at least the first alignment film 18 (i.e. the alignment film provided in the TFT substrate).

While the liquid crystal display panel illustrated herein is an FFS mode liquid crystal display panel having linear slits, the liquid crystal display panel may alternatively have bent slits, and can be applied to a transverse electric field mode liquid crystal display panel having an electrode structure having linear portions that may cause diffraction of light. The liquid crystal display panel according to the embodiment of the present disclosure is not limited to an FFS mode liquid crystal display panel but may be an IPS mode liquid crystal display panel.

The present disclosure is widely applied to a transverse electric field mode liquid crystal display panel having a slit electrode structure.

The present disclosure contains subject matter related to that disclosed in Japanese Priority Patent Application JP 2020-041951 filed in the Japan Patent Office on Mar. 11, 2020, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display panel comprising:
a first substrate;
a second substrate that faces the first substrate;
a liquid crystal layer provided between the first substrate and the second substrate;
a first polarizing plate disposed at a side of the first substrate that faces away from the liquid crystal layer; and
a second polarizing plate disposed at a side of the second substrate that faces away from the liquid crystal layer, wherein
the first substrate includes a first dielectric substrate, first and second electrodes, provided over the first dielectric substrate and configured to generate a transverse electric field in the liquid crystal layer, at least either of which has a plurality of slits, and a first alignment film placed in contact with the liquid crystal layer,
the second substrate includes a second dielectric substrate and a second alignment film provided over the second dielectric layer and placed in contact with the liquid crystal layer,
the first substrate further includes an inorganic insulating layer provided between the second electrode and the first alignment film,
a difference between a refractive index of the inorganic insulating layer and a refractive index of the second electrode is smaller than or equal to 0.20, and
a thickness of the inorganic insulating layer is greater than or equal to 50% of a thickness of the second electrode and greater than or equal to 40 nm.

2. The liquid crystal display panel according to claim 1, wherein
the second electrode has the plurality of slits, and
the second electrode is disposed closer to the liquid crystal layer than the first electrode so as to face the first electrode across a dielectric layer.

3. The liquid crystal display panel according to claim 1, wherein the refractive index of the inorganic insulating layer falls within a range of ±15% of the refractive index of the second electrode.

4. The liquid crystal display panel according to claim 1, wherein the inorganic insulating layer contains silicon nitride or silicon nitroxide.

5. The liquid crystal display panel according to claim 1, wherein the thickness of the inorganic insulating layer is smaller than or equal to 300 nm.

6. The liquid crystal display panel according to claim 1, wherein the second electrode is formed by a transparent conductive layer.

7. The liquid crystal display panel according to claim 1, wherein an angle formed by an absorption axis of the second polarizing plate and a direction in which the plurality of slits extend is greater than or equal to 5° and smaller than or equal to 10°.

8. The liquid crystal display panel according to claim 1, wherein the inorganic insulating layer has a surface step that is greater than or equal to 90% of the thickness of the second electrode.

9. The liquid crystal display panel according to claim 1, wherein the first alignment film has an azimuth anchoring strength of higher than or equal to $1\times10^{-7}$ J/m$^2$ and lower than or equal to $1\times10^{-5}$ J/m$^2$.

10. The liquid crystal display panel according to claim 1, wherein an average of contrast ratios at (azimuth angle 45°, polar angle 60°), (azimuth angle −45°, polar angle 60°), (azimuth angle 135°, polar angle 60°), and (azimuth angle −135°, polar angle 60°) be greater than or equal to 200.

11. A method for manufacturing the liquid crystal display panel according to claim 1, the method comprising forming the inorganic insulating layer by forming an inorganic insulating film over the second electrode by a thin-film deposition method.

* * * * *